United States Patent [19]

Garrant et al.

[11] Patent Number: 4,865,732

[45] Date of Patent: Sep. 12, 1989

[54] SUPPORTED MESH FILTER LEAF BAG WITH EMBEDDED ROPE CLOSURE

[75] Inventors: Gilles Garrant, Sherbrooke; Daniel Dupuis, Rock Forest, both of Canada

[73] Assignee: Ingersoll-Rand Canada, Inc., Montreal, Quebec, Canada

[21] Appl. No.: 262,155

[22] Filed: Oct. 17, 1988

Related U.S. Application Data

[63] Continuation of Ser. No. 34,254, Apr. 6, 1987, abandoned.

[51] Int. Cl.⁴ .............................................. B01D 29/14
[52] U.S. Cl. .................................... 210/232; 210/346; 210/486; 55/367; 55/379; 55/381
[58] Field of Search ............... 210/230, 232, 323.1, 210/324, 331, 346, 486; 162/272, 48; 55/334, 341.1, 361, 367, 378, 379, 381

[56] References Cited

U.S. PATENT DOCUMENTS

| 118,306 | 8/1871 | Vollmar | 210/346 |
|---|---|---|---|
| 2,081,300 | 5/1937 | Hopper | 210/346 |
| 2,547,205 | 4/1951 | Hollander | 210/346 |
| 2,551,312 | 5/1951 | Bokieh | 210/346 |
| 2,821,305 | 1/1958 | Anderson | 210/232 |
| 3,339,742 | 9/1967 | Kracklauer | 210/232 |
| 3,464,561 | 9/1969 | Wrotnowski et al. | 210/232 |
| 3,481,479 | 12/1969 | Hoskins et al. | 210/486 |
| 3,784,019 | 1/1974 | Gordon, III | 210/486 |
| 4,022,695 | 5/1977 | Howard et al. | 210/346 |

Primary Examiner—Richard V. Fisher
Assistant Examiner—Wanda L. Millard
Attorney, Agent, or Firm—Walter C. Vliet; Frank S. Troidl

[57] ABSTRACT

A mesh filter bag fits over a metal support. The bag has opposed edges longitudinally extending along one side of the mesh filtering bag from the bottom of the bag to the top of the bag. A rope extends from the filtering bag bottom along one opposed edge over the top and along the other opposed edge to the bottom. The opposed edges are held in sealing engagement by a tube.

4 Claims, 2 Drawing Sheets

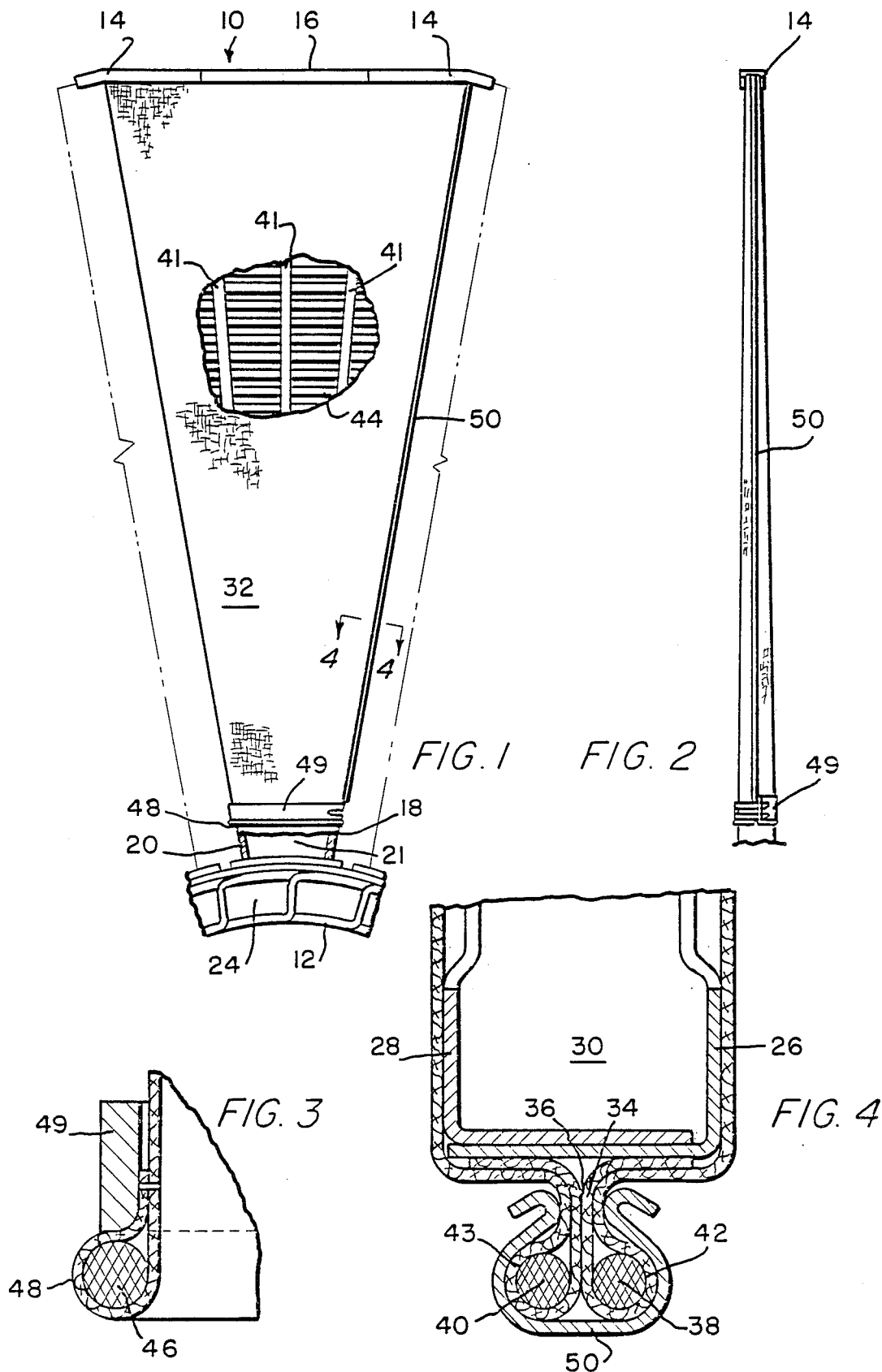

SUPPORTED MESH FILTER LEAF BAG WITH EMBEDDED ROPE CLOSURE

This is a continuation of co-pending application Ser. No. 07/034,254 filed on Apr. 6, 1987, now abandoned.

This invention relates to a filtering apparatus, and more particularly, to filters of the type used for filtering a slurry such as pulp stock for the manufacture of paper.

One type of currently used filters includes a filter support with a filtering bag mounted on the support. The filtering bag is made of a suitable material, such as polypropylene. The polypropylene bag is placed over the filter support and opposed longitudinal edges of the bag are zipped up by means of a zipper. The zipper parts are also made of a suitable material such as polypropylene.

Unfortunately, when the temperature of the slurry is above, say 165°, the zipper parts begin to break and become disengaged from the polypropylene filtering bag. When this happens, solids pass through the filtering bag and metal support, which, of course, is undesirable.

This invention provides a filter having a filtering bag which is securely mounted on the filter support. The zipper, such as used on the currently used filtering bags, is eliminated. Rope means extend along the opposed edges of a longitudinal opening in the filtering bag. The rope means are embedded in the opposed edges of the filtering bag. The opposed edges are held in sealing contact by sealing means such as a longitudinal tube.

Briefly described, the invention is a filter for removing liquid from a slurry. A mesh filtering bag is mounted on a metal support. The metal support has openings adjacent to the mesh filtering bag for the flow of filtrate into the metal support. At least one drainage duct for draining the filtrate from the support is provided in the metal support. The mesh filtering bag has opposed edges longitudinally extending along one side of the mesh filtering bag from the bottom of the bag to the top of the bag. Rope means is embedded in the opposed edges. Means are provided for holding the opposed edges in sealing engagement.

Briefly described, the new mesh filtering bag is a flexble, preshaped mesh filtering bag adapted to be installed over a rigid filtering bag support. The flexible, preshaped mesh filtering bag has two edges with embedded rope means. The two edges are located so that when the bag is installed, it will have one side with laterally opposed edges longitudinally extending from the bag bottom to the bag top. The edges are adapted to be brought into sealing engagement when installed over the filtering bag support.

The invention, as well as its many advantages, will be further understood by reference to the following detailed description and drawings in which:

FIG. 1 is an elevational side view of a filter segment constructed in accordance with one embodiment of the invention, shown with a portion of the bag broken away;

FIG. 2 is an elevational side view of the embodiment of FIG. 1;

FIG. 3 is an enlarged fragmentary sectional view of the structure for enclosing the filtering bag into seal-tight engagement on the support;

FIG. 4 is an enlarged view taken along lines 4—4 of FIG. 1;

In the various figures, like parts are referred to by like numbers.

Figure 5:
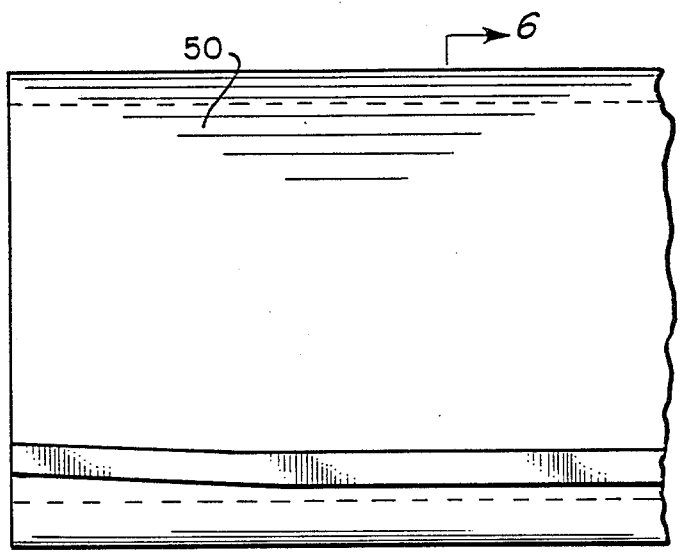
FIG. 5 is an enlarged fragmentary view of one end of the sealing tube of FIG. 1.

Referring to the drawings, and more particularly to FIG. 1, a filter segment for a disk-type filter is shown to illustrate the invention. The filter segment 10 is mounted on the usual rotatable hub 12 in juxtaposed relationship with other filter segments, adjacent ones being indicated by fragmentary and broken lines. The segment 10 is connected at its outer periphery to the adjacent segments by tubular clips 14 which internally receive the segments and the segments are attached to the clips by suitable fasteners (not shown). Each tubular clip 14 extends over adjacent top portions of juxtaposed filter segments 10. A tubular clip 16 innerconnects the tubular clips 14 to completely enclose the outer periphery of each filter segment 10.

The segment 10 comprises a base 18 which includes a central box-like section having walls 20 enclosing a downward-tapering passage or duct 21 connected to one of the flow channels 24 in the hub 12 for draining filtrate from the segment 10.

The segment 10 also has a pair of axially-spaced side walls 26, 28 (see FIG. 4), each connected at one end to the base 18 and extending longitudinally from the base 18 in opposed-spaced relationship. The side walls overlap along the radially-extending sides of the filter segment. The side walls 26, 28 serve to support the filtering bag and each wall has a plurality of radially extending, circumferentially separated lands 41 separating louvers 44 (see FIG. 1). The space 30 (see FIG. 4) between the side walls 26, 28 throughout the lengths and breadths of the side walls 26, 28 serves as a drainage duct and communicates with the passage 21 in the base 18 for draining filtrate from the filter segment.

A flexible, preshaped mesh filtering bag 32 is installed over the side walls 26 and 28 of the filtering bag support section 10. The preshaped mesh filtering bag 32 is one integral mesh piece. When fabricated, the filtering bag has rope means embedded therein in a manner such that when the bag is installed on the bag support there will be laterally opposed edges 34 and 36 (see FIG. 4) longitudinally extending from the bag open bottom to the bag closed top. The rope portions 38 and 40 are encased in loops 42 and 43 on opposed edges 34 and 36 respectively.

The preshaped, flexible mesh filtering bag open bottom abuts against a sewn hem which extends completely around the bottom of the flexible, preshaped mesh filtering bag 32. An annular rope insert 46 is embedded within the hem 48. A clamp 49 encloses the bottom of the flexible, preshaped filtering bag 32 into seal-tight engagement about the rigid filtering bag support segment 10.

The mesh filtering bag 32 may be made of polypropylene and the annular rope 46 may also be made of polypropylene.

After the flexible, preshaped mesh filtering bag has been inserted over the metal support sector 10, the opposed edges 34 and 36 (see FIG. 4) are brought into sealing contact by the longitudinally extending tube 50. The opposed edges 34 and 36 longitudinally extend along the open side of the mesh filtering bag 32 from the bottom of the bag to the top of the bag. If desired, two separate ropes may be embedded in each opposed edge 34 and 36. However, preferably, the rope means consists of a single rope which extends from the filtering bag bottom, along one opposed edge 34, over the filtering bag top and along the other opposed edge 36 to the filtering bag bottom. As shown in FIG. 4, the portions 38 and 40 of the single rope extend longitudinally along the opposed edges 34 and 36 and are laterally separated along the same plane. The rope may be made of polypropylene or any other suitable, flexible material.

Figure 6:
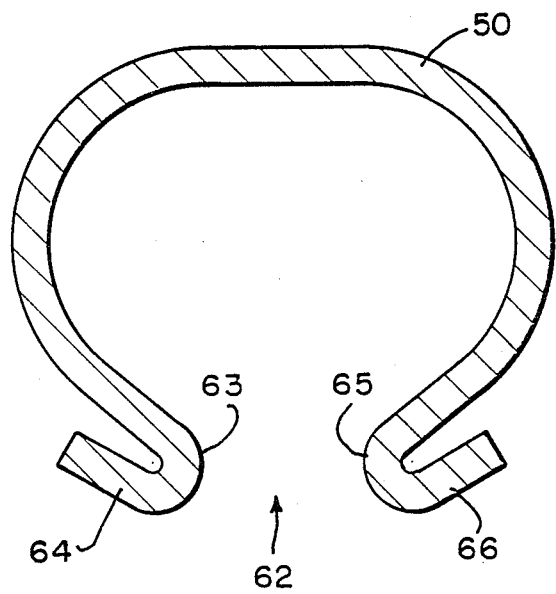
FIG. 6 is a view taken along lines 6—6 of FIG. 5 and in the direction of the arrows.
Figure 7:
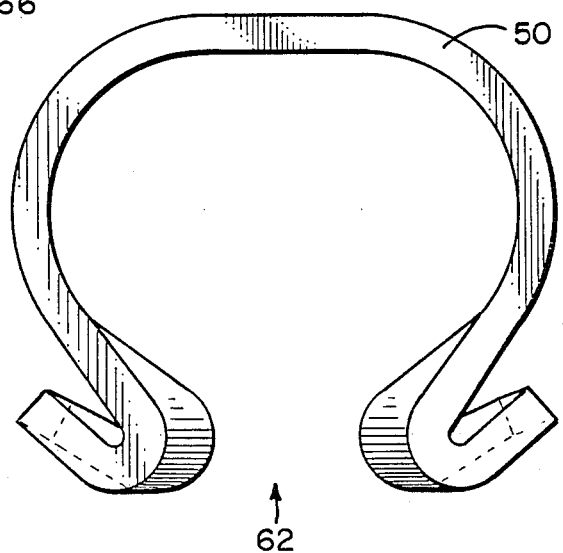
FIG. 7 is an end view of the sealing tube of FIG. 5.

The tube 50 which holds the opposed edges 34 and 36 in sealing engagement is fitted over the loops 42 and 43 and extends along the full length of the opposed edges 34 and 36. The tube 50 has a longitudinal slot 62 (see FIG. 6 and FIG. 7) in which the opposed edges, the loops, and the rope portions extend. The longitudinal slot 62 is formed by the curved surfaces 63 and 65 formed by outwardly extending lips 64 and 66, respectively, on each side of the longitudinal slot 62. Each open end of the tube 50 is flared outwardly (one flare shown in FIG. 7).

The bag 32 is installed over the filter bag support. The metal tube 50 is slid over the loose longitudinal edges of the bag into which the rope has been sewn to effectively seal the side of the bag. The curved surfaces 63 and 65 and the flared ends of the tube prevent damage to the bag during installation, shrinking and operating stages.

The tube 50 is constructed to prevent the emprisoned rope, thus the edges of the bag, from being laterally pulled out of the tube. Longitudinal movement of the tube 50 is restricted by the clamping band 49 at the lower end and the interlocking clip 14 at the upper end.

We claim:

1. A flexible, preshaped mesh filtering bag adapted to be installed over a tapering from top to bottom rigid filtering bag support having openings for the flow of filtrate into the support, and means, at one end of the support for draining filtrate from the support, said flexible, preshaped mesh filtering bag comprising: one integral form fitting mesh bag having two edges with embedded rope means located so that when installed on the rigid filtering bag support, the bag will have one side with laterally opposed edges longitudinally extending from the bottom of the bag to the top of the bag, the edges being adapted to be brought into sealing contact when installed to form a closure, said closure providing means to allow installation over said tapering rigid bag support and a means for retention of said filtering bag on said tapering rigid support, and means for holding said opposed edges in sealing engagement, wherein said mesh filtering bag is made of fiber material; and said rope means is made of fiber material, and further wherein said rope means consists of a single rope extending from the bag bottom, along one opposed edge, over the bag top, and along the other opposed edge to the bag bottom.

2. A flexible, preshaped mesh filtering bag in accordance with claim 1 wherein: the means for holding the opposed edges in sealing engagement is a single tube fitted over the opposed edges and extending along the full length of the opposed edges.

3. A flexible, preshaped mesh filtering bag in accordance with claim 2 wherein: the tube has flared open ends, a longitudinal slot in which the opposed edges extend, and an outwardly extending lip on each side of the longitudinal slot.

4. A flexible, preshaped mesh filtering bag in accordance with claim 1 wherein: the fiber material of said mesh filtering bag and said rope means is a polypropylene material.

* * * * *